United States Patent

[11] 3,624,110

[72] Inventors Gordon Alan Hughes, 615 Lanmore Ave., Wayne, Pa.;
Herchel Smith, 500 Chestnut Lane, Wayne, Pa. 19087; David Hartley, 1078 Montgomery Ave., Conshohocken, Pa.
[21] Appl. No. 386,987
[22] Filed Aug. 3, 1964
[45] Patented Nov. 30, 1971
[73] Assignee said Smith, by said Hughes and said Hartley
Continuation-in-part of application Ser. No. 194,972, May 15, 1962, now Patent No. 3,502,699. This application Aug. 3, 1964, Ser. No. 386,987

[54] 13-ETHYLGONA-4,9-DIENES
9 Claims, 2 Drawing Figs.
[52] U.S. Cl. .................................................... 260/397.3, 260/239.55 C, 260/397.4, 424/242, 424/243
[51] Int. Cl. ....................................................... C07c 169/20
[50] Field of Search ........................................... Machine
Searched Steroids

*Primary Examiner*—Henry A. French
*Attorneys*—Louis H. Baer and Vito Victor Bellino ABSTRACT: This invention is related to 13-ethylgona-4, 9-dien-3-ones and to compositions containing said compounds. The compounds are pharmacologically active and exhibit antiestrogenic, anabolic, pituitary blocking, and progestational effects.

PATENTED NOV 30 1971 3,624,110

INVENTORS
DAVID HARTLEY
GORDON ALAN HUGHES
HERCHEL SMITH

13-ETHYLGONA-4,9-DIENES

This application is a continuation-in-part of copending application Ser. No. 194,972, filed May 15, 1962. now U.S. Pat. No. 3,502,699.

This invention relates to compositions of matter classified in the art of chemistry as substituted 13-ethylgona-4,9-dien-3-ones and to processes for using such compositions.

The term "gonane," as used by chemists, refers to the unsubstituted tetracyclic perhydrocyclopentanophenanthrene nucleus. In the normal configuration of the gonane nucleus, the hydrogen atoms appearing at the eight-, 10-, and 13-positions possess what is designated as the β-configuration, i.e. they extend in a direction above the average plane of the tetracyclic ring system, and hydrogens present at the nine- and 14-positions possess what is designated as the α-configuration, i.e. they extend in a direction below the plane of the ring system. While the gonane compounds of this invention are named to describe the stereochemical configuration corresponding to that of the natural steroids, it is understood that the product of each of the given reactions is a racemic mixture of the named compound and its enantiomorph.

In describing the invention, reference will be made in this specification to the annexed drawing, wherein.

Figure 1:
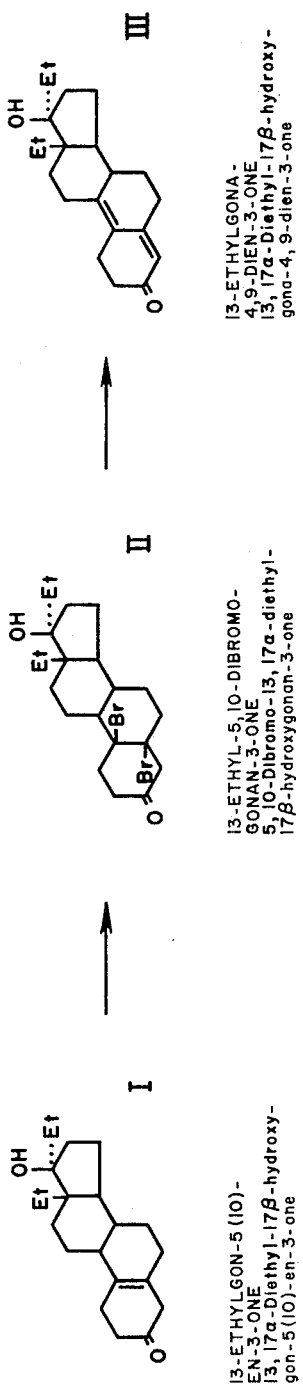
FIG. 1 illustrates schematically a reaction sequence for preparing a 13-ethylgona-4,9-dien-3-one, specifically 13,17α-diethyl-17β-hydroxygona-4,9-dien-3-one.

The invention sought to be patented, in its principal composition aspect is described as residing in the concept of a chemical compound having a molecular structure in which there is attached to the 13-position of a gona-4,9-dien-3-one nucleus an ethyl group.

The tangible embodiments of the composition aspect of the invention possess the inherent general physical properties of being high melting, white crystalline solids, are substantially insoluble in water and are generally soluble in polar solvents such as dimethylacetamide. Examination of the compounds produced according to the hereinafter described process reveals, upon spectrographic analysis, spectral data confirming the molecular structures hereinbefore set forth. The aforementioned physical characteristics, taken together with the nature of the starting materials, elemental analysis, and the mode of synthesis, positively confirm the structures of the compositions sought to be patented.

The tangible embodiments of the principal composition aspect of the invention possess the inherent applied use characteristics of exerting qualitatively varying hormonal effects in animals as evidenced by pharmacological evaluation according to standard test procedures. Such tangible embodiments show antiestrogenic, anabolic, pituitary blocking, and progestational effects. This finding indicates their usefulness for the purposes of ovulation block and contraception, pregnancy maintenance, weight gain and nitrogen retention, growth stimulation, postoperative recovery, and healing of wounds and burns. They are also useful for the treatment of disorders of the female reproductive tract, infertility, and habitual abortion.

The invention sought to be patented in a second composition aspect is described as residing in the concept of a 13,17α-diethyl-17β-hydroxygona-4,9-dien-3-one in combination with a pharmaceutical carrier.

The invention sought to be patented in a process of using aspect is described as residing in the concept of stimulating an anabolic response in a subject by administering a pharmaceutically effective dose of 13,17α-diethyl-17β-hydroxygona-4,9-dien-3-one.

The invention sought to be patented in a first subgeneric composition aspect is described as residing in the concept of a chemical compound having a 13-ethyl-17β-hydroxy-17α-lower alkylgona-4,9-dien-3-one structure.

The invention sought to be patented in a second subgeneric composition aspect is described as residing in a concept of a chemical compound having a 13-ethyl-17β-hydroxy-17α-lower alkynylgona-4,9-dien-3-one structure.

The tangible embodiments of said subgeneric composition aspects of the invention possess the inherent applied used characteristics of exerting qualitatively varying hormonal effects in animals as evidenced by pharmacological evaluation according to standard test procedures.

The manner and process of making and using the invention will now be generally described so as to enable a person skilled in the art of chemistry to make and use the same, as follows:

Referring now to FIG. 1, wherein the compounds are assigned Roman numerals for identification, the sequence of reactions involved in the preparation of a specific embodiment, namely 13,17α-diethyl-17β-hydroxygona-4,9-dien-3-one (III), is described.

A solution of 13,17α-diethyl-17β-hydroxygon-5(10)-en-3-one (I) in pyridine is added to a solution of pyridine perbromide hydrobromide in pyridine and the mixture stirred for a period of approximately 10 minutes to an hour. Heating at an elevated temperature such as 100° C. for an additional period of time, e.g. 20 minutes to more than 1 hour, results in the formation of the dehydrobrominated product (III).

The bromination-dehydrobromination sequence is most conveniently performed in one vessel as a continuous process. The bromination occurs almost immediately at room temperature. A subsequent increase in the temperature of the reaction medium aids in the dehydrobromination process. The product is isolated by conventional techniques, utilizing, for example, solution in an organic solvent, an acid wash, and recrystallization from an appropriate solvent such as ethyl acetate, ether, etc.

The reaction sequence can be carried out as a two-step procedure, in which the intermediate 5,10-dibromo compound (II) is isolated. In order to obtain this dibromo intermediate, the bromination should be conducted at a temperature no higher than 0° C.

The above-mentioned reaction sequence for converting a 13-ethylgona-4,9-dien-3-one is a general one and can be applied to a variety of starting materials having the 13-ethylgon-5(10)-en-3-one nucleus. There can be, for example, at the 17-position, a keto or ketal group, or a free or esterified hydroxy group. The acid portion of such an ester group can consist of a lower alkanoic acid such as propionic, an aralkanoic acid such as 3-phenylpropionic, an alkenoic acid such as 10-undecenoic acid, or a cycloalkylalkanoic acid such as 3-cyclopentylpropionic acid. There can also be at the 17-position a hydroxy group and any member of the group consisting of alkyl, alkenyl, alkynyl, and haloalkynyl. The latter groups are typified by the methyl, ethyl, vinyl, ethynyl, propynyl, and chloroethynyl groups. Compounds bearing any of the above-mentioned groups or structures are the full equivalents of those compounds specifically claimed.

There can also be substituted on the 1,2,6, or 7-positions of the 13-ethylgon-5(10)-en-3-one one or more lower alkyl groups such as methyl, ethyl, or propyl; lower alkoxy groups such as methoxy, ethoxy, or propoxy; alkenyloxy groups such as allyloxy; cycloalkoxy groups such as cyclopentyloxy; or hydroxy groups. The product gona-4,9-dienes obtained from these substituted gon-5(10)-enes bear the same substituents as the starting materials and are the full equivalents of the compounds specifically claimed.

When it is desired to perform the bromination-dehydrobromination procedure on a 13-ethylgon-5(10)-en-3-one having an unsaturated group attached thereto, the unsaturated group being reactive to a brominating agent, it is necessary to use an additional molecular equivalent of the brominating agent. An example of such an unsaturated group is the vinyl group. Following the debromination procedure, it is necessary to regenerate the vinyl group from the dibromoethyl compound resulting therefrom by treatment with a reagent such as sodium iodide in acetone.

Figure 2:
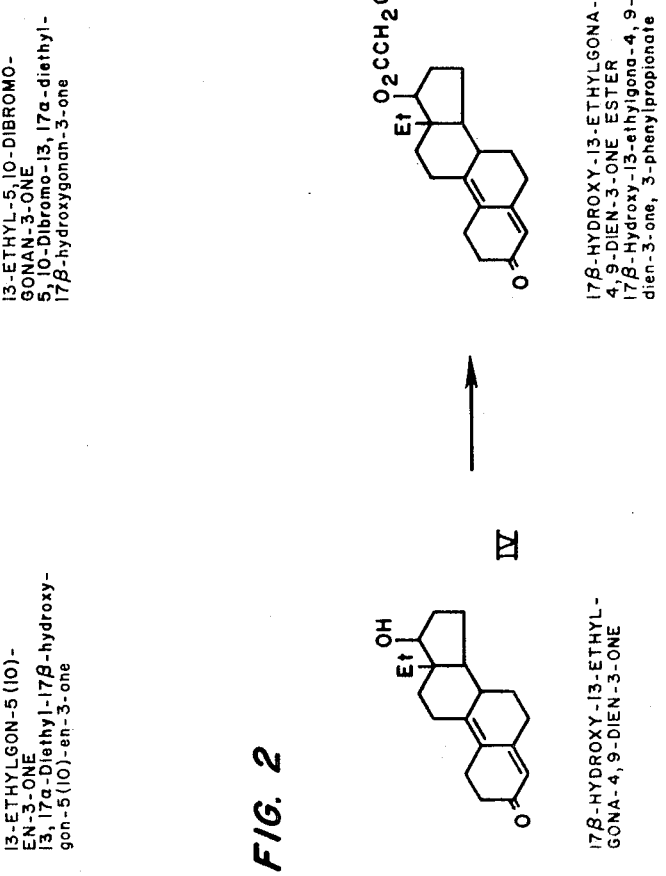
FIG. 2 illustrates schematically the esterification of 17β-hydroxy-13-ethylgona-4,9-dien-3-one, specifically to form its 3-phenylpropionate ester.

Referring now to FIG. 2, there is illustrated the reaction for preparing an ester of a 13-ethylgona-4,9-diene, specifically 13-ethyl-17β-hydroxygona-4,9-dien-3-one, 3-phenylpropionate (V). This compound is prepared by treating the corresponding 17-alcohol in pyridine with a benzene solution of 3-phenylpropionyl chloride.

The 13-ethylgona-4,9-dienes of this invention possess considerable biological activity. A particularly active compound is 13,17α-diethyl-17β-hydroxygona-4,9-dien-3-one (III). This compound was evaluated as an estrogen antagonist according to the procedure of Edgren, Acta Endocrinologica 39, 536–542 (1960). Compound III was found to possess 1,200 percent of the estrogen antagonist activity of the naturally occurring progesterone. When tested for its activity as an anabolic agent in the procedure of Hershberger et al., Proc. Soc. Exptl. Biol. Med. 83, 175 (1953), compound III was found to have 570 percent of the anabolic (or myotrophic) activity of the standard testosterone proprionate, while at the same time possessing only half the less desirable androgenic activity of the standard.

Even more potent as an estrogen antagonist is the compound 17α-chloroethynyl-13-ethyl-17β-hydroxygona-4,9-dien-3-one. This compound, when tested in the Edgren procedure, exhibited 2,100 percent of the activity of progesterone. In the progestational Clauberg procedure, Elton and Edgren, Endocrinology, 63, 464–472 (1958), the chloroethynyl compound showed 320 percent of the activity of progesterone.

13-Ethyl-17β-hydroxygona-4,9-dien-3-one possesses activity as an estrogen antagonist equal to that of progesterone. In contrast to this activity, the corresponding 13-methyl compound is inactive in this procedure.

The 3-phenylpropionate ester (V) of the last-mentioned 13-ethyl compound, in addition to possessing considerable estrogen antagonistic and anabolic activity, is active as a progestational agent. The corresponding 13-methyl compound is, however, inactive in the progestational Clauberg test.

A 17-alkynylated compound, 13-ethyl-17α-ethynyl-17β-hydroxygona-4,9-dien-3-one, possesses activity as an estrogen antagonist equal to that of progesterone. The corresponding 13-methyl compound is inactive.

It is thus apparent that the 13-ethylgona-4,9-dien-3-one compounds of this invention possess considerable biological activity, and that in view of the inactivity of certain 13-methyl-gona-4,9-dienes, this activity is indeed unexpected.

It is apparent that the gona-4,9-diene compositions of this invention having a 17-keto group may be reduced by means of a reagent such as sodium borohydride to the corresponding 17-hydroxy compounds. Such 17-hydroxy compounds may, in turn, be oxidized with a reagent such as chromium trioxide to the 17-keto analogs. The 17-keto compounds may be treated with Grignard reagent such as ethyl magnesium bromide or an organometallic reagent such as ethynyl lithium or potassium acetylide in order to introduce alkyl, alkenyl, or alkynyl groups into the 17-position thereof. 17-Hydroxy compounds can be esterified with any of a variety of acids as hereinbefore enumerated. Ketalization is accomplished by treatment of a ketone with an alcohol such as ethylene glycol or ethanol using an acidic catalyst such as p-toluenesulfonic acid.

The 13-ethylgon-5(10)-en-3-one starting materials for the preparation of the gona-4,9-dienes of the present invention can be obtained by procedures described in Belgian Pat. Nos. 595,387; 600,244; 600,245; 608,369 and 608,370.

The compositions of this invention are formulated for pharmaceutical use as solid capsules, tablets, suppositories, etc., by combining them with conventional carriers. Such conventional solid carriers include magnesium carbonate, magnesium stearate, talc, sugar, lactose, dextrin, pectin, starch, gelatin, tragacanth, methylcellulose, and sodium carboxymethylcellulose. Diluents, flavoring agents, solubilizers, lubricants, suspending agents, binders, or tablet-disintegrating agents may be employed. Liquid preparations such as solutions, suspensions, or emulsions may also be prepared. A water-propylene glycol solution may be used for parenteral injection. An aqueous suspension suitable for oral use can be made by utilizing natural or synthetic gums, resins, methylcellulose, or other well-known suspending agents.

Representative formulations embodying specific compositions of this invention follow:

A pharmaceutical tablet for use as an oral anabolic agent consists of the following ingredients:

| | mg. |
|---|---|
| 13,17α-Diethyl-17β-hydroxygona-4,9-dien-3-one | 5 |
| Carboxymethylcellulose (viscosity 400 cps.) | 15 |
| Lactose powder | 25 |
| Redried cornstarch | 25 |
| Magnesium stearate powder | 4 |
| Calcium silicate powder | q.s. |
| | 200 |

A capsule for use as an oral anabolic agent contains, in encapsulating gelatin, the following ingredients:

| | mg. |
|---|---|
| 13,17α-Diethyl-17β-hydroxygona-4,9-dien-3-one | 5 |
| Finely divided silica lubricant | 5 |
| Magnesium stearate powder | 5 |
| Powdered cornstarch | 113 |
| Lactose powder | q.s. |
| | 245 |

An anabolic agent suspension for oral use consists of the following ingredients per 5 cc:

| | mg. |
|---|---|
| 13,17α-Diethyl-17β-hydroxygona-4,9-dien-3-one | 5.0 |
| Magnesium aluminum silicate (thickening agent) | 37.5 |
| Carboxymethylcellulose of low viscosity | 37.5 |
| Polyoxyethylene sorbitan monolaurate | 50.0 |
| Glycerin | 250.0 |
| Sucrose | 2,000.0 |
| Methyl p-hydroxybenzoate | 5.0 |
| Propyl p-hydroxybenzoate | 1.0 |
| Flavor and distilled water | q.s. |

An anabolic agent suspension for parenteral use consists of the following ingredients per cc:

| | |
|---|---|
| 13,17α-Diethyl-17β-hydroxygona-4,9-dien-3-one | 0.5 |
| Benzyl alcohol | 10.0 |
| Sodium chloride | 90.0 |
| Polyoxyethylene sorbitan monooleate | 4.0 |
| Sodium carboxymethylcellulose | 5.0 |
| Water for injection | q.s. q.s. |

Pediatric drops for use as an anabolic agent consist of the following ingredients per drop (0.05 cc.):

| | mg. |
|---|---|
| 13,17α-Diethyl-17β-hydroxygona-4,9-dien-3-one | 0.500 |
| Magnesium aluminum silicate (thickening agent) | 0.375 |
| Polyoxyethylene sorbitan monolaurate | 0.500 |
| Disodium phosphate heptahydrate | 0.375 |
| Citric acid monohydrate | 0.060 |
| Glycerin | 1.250 |
| Methyl p-hydroxybenzoate | 0.025 |
| Propyl p-hydroxybenzoate | 0.005 |
| Butyl p-hydroxybenzoate | 0.020 |
| Distilled water | 0.015 |
| Sodium saccharin | 0.013 |
| Sorbitol and flavor | q.s. |

A long-acting anabolic agent tablet consists of the following ingredients:

| | mg. |
|---|---|
| 13,17α-Diethyl-17β-hydroxygona-4,9-dien-3-one | 5 |
| Water-insoluble acid carboxyvinyl polymer of acrylic acid copolymerized with 0.75-2% of polyallyl sucrose (the Carbopol 934 of U.S. Pat. No. 2,909,462) | 150 |
| Magnesium stearate powder | 2 |
| Lactose | q.s. |

The amount of active compound in each of the above pharmaceutical formulations can be varied as desired. The daily dosage will vary between 0.5 and 5 mg. per day.

EXAMPLE 1

13-Ethyl-17β-hydroxygona-4,9-dien-3-one

Add a solution of 13-ethyl-17β-hydroxygon-5(10)-en-3-one (2.16 g.) in pyridine (7.5 cc.) to a solution of pyridine perbromide hydrobromide (2.4 g.) in pyridine (22.5 cc.). Stir the mixture under nitrogen for 30 minutes at room temperature and then heat at 100° for a further 30 minutes. Cool, add the mixture to 2N hydrochloric acid (300 cc.) and crushed ice (100 g.), and collect the product in ether-benzene. Remove the solvent, recrystallize the residue from ether to obtain 13-ethyl-17β-hydroxygona-4,9-dien-3-one (1.55 g.), m.p. 147°–148°. The analytical specimen, obtained by two further recrystallizations from ethyl acetate-benzene, has m.p. 152°–154.5°; ultraviolet absorption 303 mμ (ε19,200); infrared absorption 3400, 1640, 1612, 1578 cm.$^{-1}$.

$C_{19}H_{26}O_2$ Calculated: C, 79.7%; H, 9.15%
Found: C, 79.8%; H, 9.3%

EXAMPLE 2

13-Ethyl-17β-hydroxygona-4,9-dien-3-one

To a solution of 13-ethyl-17β-hydroxygon-5(10)-en-3-one (0.56 g.) in dry pyridine (20 cc.) at 0°, add pyridine perbromide hydrobromide (0.68 g.) in small portions during 5 minutes with stirring, and keep the mixture at 0° for 20 minutes. Then dilute with water (400 cc.) containing aqueous N sodium thiosulfate solution (1.0 cc.); crystallize the oily precipitate obtained by rubbing with a glass rod; filter and dry in vacuo to obtain 5α, 10β-dibromo-13-ethyl-17β-hydroxygonan-3-one (0.72 g.), m.p. (decomp.) 124°.

Allow a solution of the dibromo compound (0.03 g.) in pyridine (2 cc.) to stand at room temperature for 14 hours, warm on a steam bath for 5 minutes, then cool and pour into water (50 cc.); isolate the product by means of ether extraction to obtain 0.015 g. Crystallize by rubbing with ether to obtain 13-ethyl-17β-hydroxygona-4,9-dien-3-one (0.008 g.), m.p. 151°–153°; ultraviolet absorption 307 mμ (ε20,400).

EXAMPLE 3

13-Ethylgona-4,9-diene-3,17-dione

Add pyridine perbromide hydrobromide (1.5 g.) with stirring to a solution of 13-ethylgon-5(10)-ene3,17-dione (1.5 g.) in pyridine (50 cc.) under nitrogen. Stir the mixture for 10 minutes at room temperature, then for 20 minutes on the steam bath. Work up to obtain a product which, when recrystallized from ethyl acetate, gives 13-ethylgona-4,9-diene-3,17-dione (0.85 g.), m.p. 126°–128°; ultraviolet absorption 303 mμ (ε20,200); infrared absorption 1733, 1645, 1597, 1575 cm.$^{-1}$.

$C_{19}H_{26}O_2$ Calculated: C, 80.3%; H, 8.45%
Found: C, 80.3%; H, 8.14%

EXAMPLE 4

13-Ethyl-17β-hydroxygona-4,9-dien-3-one, 3-phenylpropionate

Add a solution of 3-phenylpropionyl chloride (12 cc.) in benzene (50 cc.) to a solution of 13-ethyl-17β-hydroxygona-4,9-dien-3-one (11 g.) in pyridine (50 cc.) at −18°. Leave the mixture overnight at −10°, add it to crushed ice, and acidify with 20 percent hydrochloric acid. Collect the product with benzene-ether and evaporate the solvent. Recrystallize the residue from benzene-ether to obtain the title product (9 g.), m.p. 127°–129°; ultraviolet absorption 305 mμ (ε21,600); infrared absorption (CHCl₃) 1725, 1650, 1605 cm.$^{-1}$.

$C_{28}H_{34}O_3$ Calculated: C, 80.3%; H, 8.2%
Found: C, 80.65%; H, 8.2%

EXAMPLE 5

13-Ethyl-17β-hydroxygona-4,9-dien-3-one, 10-undecenoate

Add a solution of undecenoyl chloride (2 g.) in benzene (6 cc.) to a solution of 13-ethyl-17β-hydroxygona-4,9-dien-3-one (2 g.) in pyridine (6 cc.) at −15°. Leave the mixture overnight at −10° and then work up as in the previous example to obtain the title product (2.1 g.); infrared absorption 1730, 1665, 1735, 1610 cm.$^{-1}$.

EXAMPLE 6

13-Ethyl-17β-hydroxy-17α-vinylgona-4,9-dien-3-one

Shake a solution of 13-ethyl-17α-ethynyl-3-methoxygona-2,5(10)-dien-17β-ol (1 g.) in pyridine (20 cc.) with palladium on calcium carbonate catalyst (0.05 g.) in an atmosphere of hydrogen according to the procedure of Sandoval et al., J. Am. Chem. Soc., 77, 150 (1955). When 1 mole of hydrogen has been absorbed, filter the mixture and evaporate the filtrate to dryness in vacuo. Heat the residue in methanol (100 cc.) with a solution of oxalic acid dihydrate (1 g.) in water (10 cc.), and allow the mixture to stand at room temperature for 45 minutes. Dilute the solution with ether (300 cc.), wash with water, saturated aqueous sodium bicarbonate solution, and water, and dry.

Evaporate the solvent and crystallize the residue from methanol to obtain 13-ethyl-17β-hydroxy-17α-vinylgon-5(10)-en-3-one. Cool a solution of this product (0.5 g.) in pyridine (12 cc.) to 0° and treat the solution with pyridine perbromide hydrobromide (1.1 g.); stir for 1 hour at room temperature and then reflux for a further hour. Cool, dilute mμ solution with water, and extract with ether. Wash, dry, and evaporate the ethereal solution. Dissolve the residue in acetone 1600 30 cc.) containing sodium iodide (3 g.) and reflux for 5 hours. Dilute the cooled solution with ether (100 cc.), wash with water, dry, and remove the solvent in vacuo. Absorb the residue on neutral alumina (40 g.) and elute with benzene. Elution with benzene-ether mixtures gives, after evaporation of the solvent and crystallization from methanol, the title product. Ultraviolet absorption 306 mμ (ε18,000); infrared absorption 1645, 1605 cm.$^{-1}$.

EXAMPLE 7

13-Ethyl-17α-ethynyl-17β-hydroxygona-4,9-dien-3-one

Add a solution of 13-ethyl-17α-ethynyl-17β-hydroxygon-5(10)-en-3-one (0.68 g.) in pyridine (5 cc.) to a solution of pyridine perbromide hydrobromide (0.7 g.) in pyridine (7.5 cc.).

Carry out the reaction and work up the product as in example 1 to obtain (from ether) the title product (0.5 g.), m.p. 180°–185°. Take up this material in ether-benzene (1:1) and percolate the solution through activated Fuller's earth (Florex XXS). The product obtained by recrystallization from chloroform-hexane has m.p. 182.5°–185.5°; ultraviolet absorption 306 mμ (ε20,000); infrared absorption 3230, 3320, 2080, 1634, 1600 cm.$^{-1}$.

$C_{21}H_{26}O_2$ Calculated: C, 81.25%; H, 8.4%
Found: C, 81.0%; H, 8.3%

EXAMPLE 8

17α-Chloroethynyl-13-ethyl-17β-hydroxygona-4,9-dien-3-one

Treat 13-ethyl-3-methoxygona-2,5(10)-dien-17-one (8 g.) with chloroethynyl lithium to obtain 17α-chloroethynyl-13-ethyl-3-methoxygona-2,5(10)-dien-17β-ol (4.5 g.). Hydrolyze this compound (2.5 g.) with oxalic acid-methanol and dioxane to obtain 17α-chloroethynyl-13-ethylgon-5(10)-en-17β-ol (2.0 g.). Treat this compound (1.2 g.) with a solution of pyridine perbromide hydrobromide (1.1 g.) in pyridine (40 ml.) as in example 1 to obtain the title compound (750 mg.); ultraviolet absorption peak at 307 mμ (ε20,100).

EXAMPLE 9

13,17α-Diethyl-17β-hydroxygona-4,9-dien-3-one

Add a solution of 13,17α-diethyl-17β-hydroxygon-5(10)-en-3-one (15.8 g.) in pyridine (75 cc.) to a solution of pyridine perbromide hydrobromide (17 g.) in pyridine (75 cc.). Carry out the reaction and work up the product as in example 1 to obtain (from ether-hexane) the title product (11.1 g.), m.p. 119°–121°. The analytical sample, obtained by recrystallization from ethyl acetate, has m.p. 121°–122°; ultraviolet absorption 307 mμ (ε21,200); infrared absorption 3410, 1650, 1600, 1572 cm.$^{-1}$.

$C_{21}H_{30}O_2$ Calculated: C, 80.2%; H, 9.6%
Found: C, 80.3%; H, 9.4%

EXAMPLE 10

13-Ethyl-17β-hydroxy-17α-(1-propynyl)gona-4,9-dien-3-one

Add a solution of 13-ethyl-3-methoxy-17α-(1-propynyl)gona-2,5(10)-dien-17β-ol (1.5 g.) in dioxane (20 cc.) with stirring to methanol (50 cc.) containing oxalic acid dihydrate (1 g.) and water (10 cc.). Stir the mixture for 20 minutes, after which a clear solution is obtained, and add water slowly until a crystalline precipitate is obtained. Filter off the crystals, wash with water, and dry to obtain 13-ethyl-17β-hydroxy-17α-(1-propynyl)gon-5(10)-en-3-one (1.3 g.), m.p. 157°–159°.

Add pyridine perbromide hydrobromide (1.4 g.) with stirring under nitrogen to a solution of this 5(10) compound (1.5 g.) in pyridine (50 cc.). Stir the mixture for 10 minutes at room temperature and then for 20 minutes on the steam bath. Work up as in example 1 to obtain a product which, when recrystallized from ethyl acetate-hexane, gives the title product (0.75 g.), m.p. 160°–163°; ultraviolet absorption 306–307mμ (ε19,600); infrared absorption 3400, 1600, 1630 cm.$^{-1}$.

EXAMPLE 11

13-Ethylgona-4,9-diene-3,17-dione, 17-cyclic ethylene ketal

Stir 13-ethyl-3-methoxygona-2,5(10)-dien-17-one, cyclic ethylene ketal (0.4 g.) with methanol (30 cc.) and oxalic acid (0.46 g.) in water (6 cc.) for 1 hour at room temperature. Add ether (100 cc.), wash the mixture with aqueous sodium bicarbonate and water, and dry. Evaporate the solvent and crystallize the product from ethanol. Dissolve this compound (0.5 g.) in pyridine (10 cc.) and add pyridine perbromide hydrobromide (0.5 g.) at room temperature in an atmosphere of nitrogen for 30 minutes and then keep at 100° for 30 minutes. Dilute the cooled reaction mixture with water (50 cc.) and extract with ether. Wash the ethereal solution with ice cold N hydrochloric acid (3×30 cc.), sodium bicarbonate solution, and water, and dry. Remove the solvent under reduced pressure and filter the residue through 'Florisil' with ether-benzene. Remove the solvent to obtain the title product. Infrared absorption 1648 cm.$^{-1}$; ultraviolet absorption 305 mμ (ε19,000).

EXAMPLE 12

13-Ethyl-17α-ethynyl-17β-hydroxygona-4,9-dien-3-one

Add to a solution of 13-ethyl-17β-hydroxygona-4,9-diene-3-one (3.6 g.) in benzene (100 cc.), ethylene glycol (14 cc.) and p-toleuenesulfonic acid monohydrate (0.2 g.), and reflux the mixture for 6 hours using a Dean-Stark water separator. After cooling, pour the solution into water (150 cc.) and extract with ether. Evaporate the washed and dried extracts. Take up the residue in a little benzene and chromatograph on neutral alumina (55 g.). Elute with a mixture of equal volumes of benzene and light petroleum to obtain 13-ethyl-17β-hydroxygona-5(10),9(11)-dien-3-one, cyclic ethylene ketal (3,53 g.) as a pale yellow gum; infrared absorption 3400, 1640, 1610, 1120, 1088, 1057 cm.$^{-1}$; ultraviolet absorption 236 mμ (ε17,250), 242mμ (ε17,900) and 252 mμ (ε12,500).

To a stirred, gently refluxing solution of this ketal (1.78 g.) in dry toluene (210 cc.) and cyclohexanone (30 cc.) under nitrogen, add during 2½ hours aluminum isopropoxide (2.12 g.) in dry toluene (125 cc.). After refluxing for a further hour, cool and add a solution of potassium carbonate (4.5 g.) and potassium sodium tartrate (9 g.) in water (90 cc.). Then ether-extract, and wash, dry, and evaporate the extracts. Take up the residue in a little benzene and chromatograph on neutral alumina (50 g.). Elute with benzene to obtain 13-ethylgona-5(10),9(11)-diene-3,17-dione, 3-cyclic ethylene ketal (1.33 g.) as a pale yellow gum; infrared absorption 1730, 1640, 1610 cm.$^{-1}$; ultraviolet absorption 235 mμ (ε18,800), 241 mμ (ε19,300 and 249 mμ (ε13,850).

Pass dry acetylene gas through a stirred solution of the above 17-ketone 3-ketal (1.27 g.) in dimethylacetamide (40 cc.) for 15 minutes; then add lithium acetylide (1 g.) in ethylenediamine (3 cc.) and dioxane (3 cc.) and continue stirring for 4½ hours. Pour the dark brown solution obtained onto ice and extract with ether; evaporate the washed and dried ether extracts to obtain a residue which crystallizes on rubbing with ether, yielding 13-ethyl-17α-ethynyl-17β-hydroxygona-5(10),9(11)-dien-3-one, cyclic ethylene ketal (0.8 g.), m.p. 147°–153°, raised to 161°–164° on recrystallization from ether.

Treat the 17-ethynyl-3-ketal thus obtained (0.06 g.) in methanol (5 cc.) with concentrated hydrochloric acid (0.5 cc.) in water (0.3 cc.) and allow the mixture to stand at room temperature for 16 hours. Dilute the solution with water and filter off the precipitate; dry to obtain the title product (0.027 g.), m.p. 180°–185° on recrystallization from ether; infrared absorption 3220, 1640, 1608, 1585 cm.$^{-1}$; ultraviolet absorption 306 mμ (ε21,800).

EXAMPLE 13

13,17α-Diethyl-17β-hydroxygona-4,9-dien-3-one

Shake a solution of 13-ethyl-17α-ethynyl-17β-hydroxygona-5(10),9(11)-dien-3-one, cyclic ethylene ketal (0.18 g.) in benzene with a 5 percent palladium on charcoal catalyst (0.1 g.) in an atmosphere of hydrogen. Hydrogen absorption slows markedly after an amount corresponding to selective saturation of the ethynyl group (21.6 cc.) has been absorbed, and hydrogenation is then discontinued; filter off the catalyst and evaporate the filtrate. The residue (0.144 g.) is 13,17α-diethyl-17β-hydroxygona-5(10),9(11)-dien-3-one, cyclic ethylene ketal; infrared absorption 3400, 1640, 1610, 1150, 1120, 1085, 1056 cm.$^{-1}$; ultraviolet absorption 234 mμ (ε16,400), 243 mμ (ε18,800), 252 mμ (ε11,100).

Allow this product (0.1 g.) to stand in methanol (5 cc.) containing concentrated hydrochloric acid (0.3 cc.) in water (0.2 cc.) at room temperature for 2 hours. Then pour onto water and isolate the product by means of ether as a yellow gum (0.08 g.); rubbing with ether deposits crystals of the title product, m.p. 115°–118°; infrared absorption 3400, 1645, 1605, 1575 cm.$^{-1}$; ultraviolet absorption 307 mμ (ε21,000).

EXAMPLE 14

13-Ethylgona-4,9-diene-3,17-dione

Allow 13-ethylgona-5(10,9(11)-diene-3,17-dione, 3-cyclic ethylene ketal (0.095 g.) to stand in methanol (5 cc.) overnight with concentrated hydrochloric acid (0.3 cc.) and water (0.22 cc.) at room temperature. Dilute with water and isolate by means of ether to obtain a residue; crystallize by rubbing with ether to obtain the title product (0.02 g.), m.p. 118°–122°; ultraviolet absorption 304 mμ (ε16,500).

We claim:
1. A compound of the structure

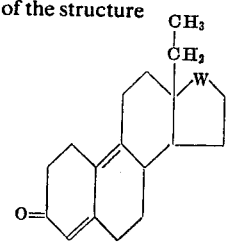

wherein W is

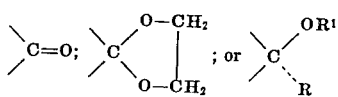

wherein

R is hydrogen, lower alkyl, lower alkenyl, lower alkynyl, or halo-lower alkynyl, and R¹ is hydrogen or lower carboxylic acyl.

2. 13-Ethyl-17β-hydroxy-17α-lower alkylgona-4,9-dien-3-one.

3. 13-Ethyl-17β-hydroxy-17α-lower alkynylgona-4,9-dien-3-one.

4. 13-Ethylgona-4,9-diene-3,17-dione.

5. 13-Ethyl-17β-hydroxygona-4,9-dien-3-one.

6. 13-Ethyl-17β-hydroxygona-4,9-dien-3-one, 3-phenylpropionate.

7. 13-Ethyl-17α-ethynyl-17β-hydroxygona-4,9-dien-3-one.

8. 17α-Chloroethynyl-13-ethyl-17β-hydroxygona-4,9-dien-3-one.

9. 13,17α-Diethyl-17β-hydroxygona-4,9-dien-3-one.

* * * * *